(12) United States Patent
Ikeuchi et al.

(10) Patent No.: US 8,339,107 B2
(45) Date of Patent: Dec. 25, 2012

(54) PORTABLE DEVICE AND BATTERY PACK FOR THE SAME

(75) Inventors: Akira Ikeuchi, Atsugi (JP); Itsuki Nakano, Atsugi (JP); Kenichi Kasai, Tama (JP); Katsuya Suzuki, Tokyo (JP); Kuniharu Suzuki, Tokyo (JP)

(73) Assignees: Mitsumi Electric Co., Ltd., Tokyo (JP); Sony Mobile Communications Japan, Inc., Tokyo (JP)

( * ) Notice: Subject to any disclaimer, the term of this patent is extended or adjusted under 35 U.S.C. 154(b) by 546 days.

(21) Appl. No.: 12/334,596

(22) Filed: Dec. 15, 2008

(65) Prior Publication Data

US 2009/0153103 A1 Jun. 18, 2009

(30) Foreign Application Priority Data

Dec. 18, 2007 (JP) ................................. 2007-326444

(51) Int. Cl.
*H02J 7/16* (2006.01)
(52) U.S. Cl. ........................................ 320/150; 320/153
(58) Field of Classification Search .................... 320/150
See application file for complete search history.

(56) References Cited

U.S. PATENT DOCUMENTS

| | | | | |
|---|---|---|---|---|
| 5,831,350 A | * | 11/1998 | McConkey et al. | 320/125 |
| 2002/0047732 A1 | * | 4/2002 | Akahori | 327/93 |
| 2006/0214639 A1 | * | 9/2006 | Miwa et al. | 320/134 |

FOREIGN PATENT DOCUMENTS

| | | |
|---|---|---|
| JP | 06-233471 | 8/1994 |
| JP | 2000-209788 | 7/2000 |
| JP | 2002-523885 | 7/2002 |
| JP | 2003-061255 | 2/2003 |
| JP | 2007-026712 | 2/2007 |

OTHER PUBLICATIONS

Japanese Office Action mailed Jul. 24, 2012 with partial English translation.

* cited by examiner

*Primary Examiner* — Drew A Dunn
*Assistant Examiner* — Robert Grant
(74) *Attorney, Agent, or Firm* — IPUSA, PLLC

(57) ABSTRACT

A portable device is disclosed that includes a charge control circuit configured to control charging of a secondary battery included in a battery pack, the secondary battery being configured to supply power to the portable device; a temperature detection terminal at which the temperature of the secondary battery is detected from a temperature detection part of the battery pack; positive and negative power terminals to be connected to the battery pack; a control circuit configured to control the operation of the portable device; and an interface circuit connected between the temperature detection terminal and each of an input terminal of the charge control circuit and an input terminal of the control circuit, in which a signal detected at the temperature detection terminal is fed to each of the charge control circuit and the control circuit through the interface circuit.

9 Claims, 4 Drawing Sheets

PORTABLE DEVICE AND BATTERY PACK FOR THE SAME

BACKGROUND OF THE INVENTION

1. Field of the Invention

The present invention relates to a portable device and a battery pack capable of being used for the portable device, more specifically to a portable device having three terminals through which the portable device is electronically connected to a battery pack and the battery pack capable of being used for the portable device.

2. Description of the Related Art

Recently, more and more lithium-ion batteries have been used as secondary batteries in portable devices such as digital cameras and cellular phones. It is known, however, that lithium-ion batteries are especially susceptible to overcharging and overdischarging. Therefore, lithium-ion batteries are typically installed in a battery pack including a protection circuit against overcharging and overdischarging. Further, some battery packs having such protection circuits further include a thermistor. By having the thermistor, it becomes possible for a portable device connected to the battery pack to detect a voltage of the battery pack changing in accordance with the change of the temperature of the battery pack, so that the portable device may control the charging of the battery pack.

FIG. 1 is a block diagram showing a configuration of a conventional battery pack and a charge control section of a conventional portable device. As shown in FIG. 1, in the battery pack 1, a lithium-ion battery 2 is connected in parallel with a series circuit comprising a resistor R1 and a capacitor C1. The positive electrode of the lithium-ion battery 2 is connected to an external terminal 3 of the battery pack 1, and the negative electrode of the lithium-ion battery 2 is connected to an external terminal 4 of the battery pack 1 through n-channel MOS (Metal Oxide Semiconductor) transistors M1 and M2 capable of interrupting the current flowing through the MOS transistors M1 and M2, respectively.

The drains of the MOS transistors M1 and M2 are connected to each other. The source of the MOS transistor M1 is connected to the negative electrode of the lithium-ion battery 2, and on the other hand, the source of the MOS transistor M2 is connected to the external terminal 4. Further, body diodes D1 and D2 are equivalently connected between the drain and the source of the MOS transistors M1 and M2, respectively.

The battery pack 1 further includes a protection IC (Integrated Circuit) 5 having an overcharging detection circuit, an overdischarging detection circuit, and an overcurrent detection circuit. The protection IC 5 operates while voltages VDD and VSS are supplied to the protection IC 5, the voltage VDD being supplied from the positive electrode of the lithium-ion battery 2 through the resistor R1, and the voltage VSS being supplied from the negative electrode of the lithium-ion battery 2.

When the overdischarging detection circuit or the overcurrent detection circuit of the protection IC 5 detects the overdischarging or the overcurrent, respectively, the DOUT (output) terminal of the protection IC 5 is set to a low level to turn OFF the MOS transistor M1. On the other hand, when the overcharging detection circuit of the protection IC 5 detects the overcharging, the COUT (output) terminal of the protection IC 5 is set to a low level to turn OFF the MOS transistor M2. The battery pack 1 further includes a thermistor R3 connected between the external terminal 4 and an external terminal 6 of the battery pack 1.

While the lithium-ion battery 2 is being charged, a predetermined voltage is present at the external terminal 6 through a divided-voltage resistor R4 by a reference voltage source Vref1 11 of a portable device 7 connected to the battery pack 1. The resistance of the thermistor R3 changes in accordance with the change of the temperature of the battery pack 1. Therefore, the voltage at the external terminal 6 changes in accordance with the change of the temperature of the battery pack 1.

The portable device 7 includes terminals 8, 9, and 10 electronically connectable to the terminals 3, 4, and 6, respectively, of the battery pack 1 when the portable device 7 and the battery pack 1 are connected to each other. The terminals 8 and 9 are a positive power source terminal and a negative power source terminal, respectively. The terminal 10 is used for detecting the voltage at the external terminal 6. Further, the portable device 7 includes the reference voltage source Vref1 11, a current source 12, a diode D3, a comparator 13, a charging control circuit 14, and a MOS transistor M3.

The voltage at the external terminal 6 and accordingly at the terminal 10 is input to one of the input terminals of the comparator 13. The voltage at the terminal 10 is the divided voltage calculated based on the values of the reference voltage 11, the resistor R4 and the thermistor R3. A predetermined voltage VT generated by the current source 12 and the diode D3 is input to the other input of the comparator 13. The output of the comparator 13 changes when the voltage detected by the terminal 10 is lower than the predetermined voltage VT. The output of the comparator 13 is input to the charging control circuit 14.

The charging control circuit 14 turns ON and OFF the MOS transistor M3 in accordance with, for example, the charging current or the charging voltage. Further, when the external terminals 3 and 4 of the battery pack 1 are electrically connected to the terminals 8 and 9, respectively, the charging control circuit 14 becomes capable of detecting the increase of the temperature of the battery pack 1 by detecting the change of the voltage at the terminal 10. When the increase of the temperature of the battery pack 1 is detected, the charging control circuit 14 prevents the battery pack 1 from being charged. More specifically, when the resistance of the thermistor R3 is reduced and, as a result, the voltage detected at the terminal 10 is lower than the predetermined voltage VT, the charging control circuit 14 is deactivated to turn OFF the MOS transistor M3 to prevent battery pack 1 from being charged.

In such a configuration including a conventional battery pack and a conventional portable device connected to the battery pack, there may be also included a functional circuit such as a status detection circuit capable of detecting a status such as remaining capacity of the lithium-ion battery 2. In such a case, a communication terminal to transmit the output signal from the status detection circuit to the portable device is additionally provided on the battery pack. Through the communication terminal of the battery pack, the portable device connected to the battery pack receives the signal indicating the status information of the battery pack in order to control the status of the battery pack.

Japanese Patent Application Publication No. 2000-209788 discloses a charging device capable of receiving a control signal through the communication terminal of a battery pack so that the received control signal may be used for controlling the charging of the battery pack.

However, when the communication terminal is additionally provided in a conventional battery pack, the number of terminals of the battery pack is increased to four (4). If this is the case, the portable device is also required to have four terminals, which necessitates a change in the specifications of the portable device, which may cause a cost increase. Further, from a physical point of view, all the additional parts due to the specification change may also be required to be installed in the same limited space inside the battery pack. Therefore, it may be difficult to provide the additional terminal in the battery pack.

SUMMARY OF THE INVENTION

According to an aspect of the present invention, a battery pack and a portable device to be used with the battery pack are provided that are capable of communicating with each other without changing the specifications of the battery pack and the portable device.

According to another aspect of the present invention, a battery pack and a portable device to be used with the battery pack are provided that are capable of communicating with each other without increasing the number of terminals.

According to another aspect of the present invention, a portable device includes a charge control circuit controlling charging of a secondary battery included in a battery pack, the secondary battery being capable of supplying power to the portable device; a temperature detection terminal detecting data indicating a temperature of the secondary battery from temperature detection means of the battery pack; positive and negative power terminals connected to the battery pack; a main control circuit controlling an operation of the portable device; and an interface circuit connected between the temperature detection terminal and an input terminal of the charge control circuit and between the temperature detection terminal and an input terminal of the main control circuit, in which a signal detected at the temperature detection terminal is output to each of the charge control circuit and the main control circuit through the interface circuit.

By having this structure, it becomes possible for the battery pack and the portable device to communicate with each other without changing the specifications of the battery pack and the portable device.

According to another aspect of the present invention, a battery pack includes a first external terminal connected to the temperature detection terminal of a portable device; second and third external terminals connected to positive and negative power terminals, respectively, of the portable device; a secondary battery connected between the second external terminal and the third external terminal; a status detection circuit connected between the second external terminal and the third external terminal and detecting a status of the secondary battery; a thermistor connected between the first external terminal and the third external terminal; and a level-shift circuit connected between the first external terminal and the output terminal of the status detection circuit and changing a voltage level of an output signal of the status detection circuit.

By having this structure, it becomes possible for the battery pack and the portable device to communicate with each other without changing the specifications of the battery pack and the portable device.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In an embodiment of the present invention, one of the external terminals of the battery pack used as a terminal through which a portable device connected to the battery pack may detect the temperature of the battery pack may also be used as a communication terminal for the communications between the battery pack and the portable device. Further, a portable device of the embodiment of the present invention includes an interface circuit enabling the external terminal to be used as each of the temperature detection terminal and the communication terminal.

Figure 1:
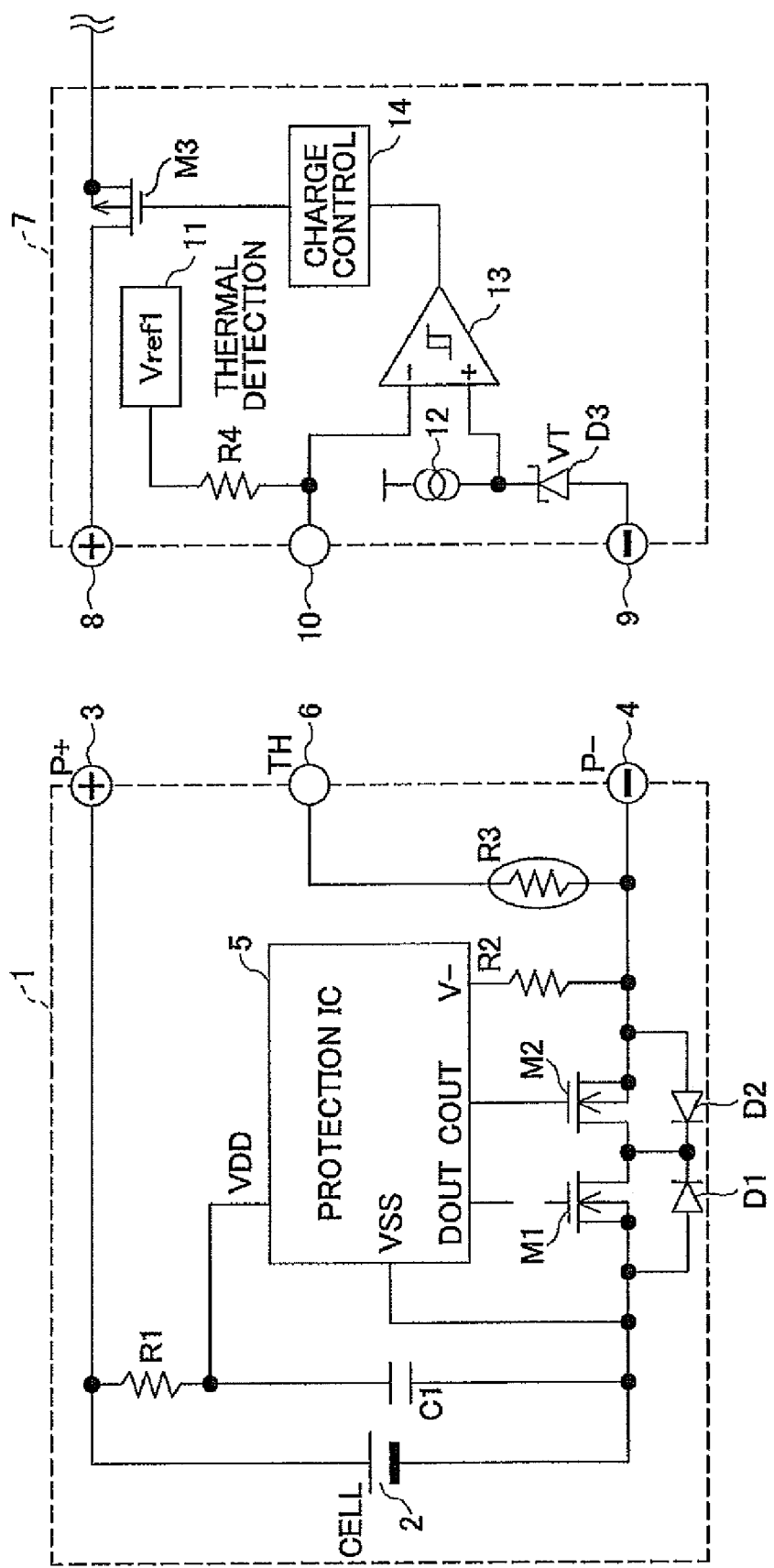
FIG. 1 is a block diagram showing a configuration of a conventional battery pack and a conventional portable device.
Figure 2:
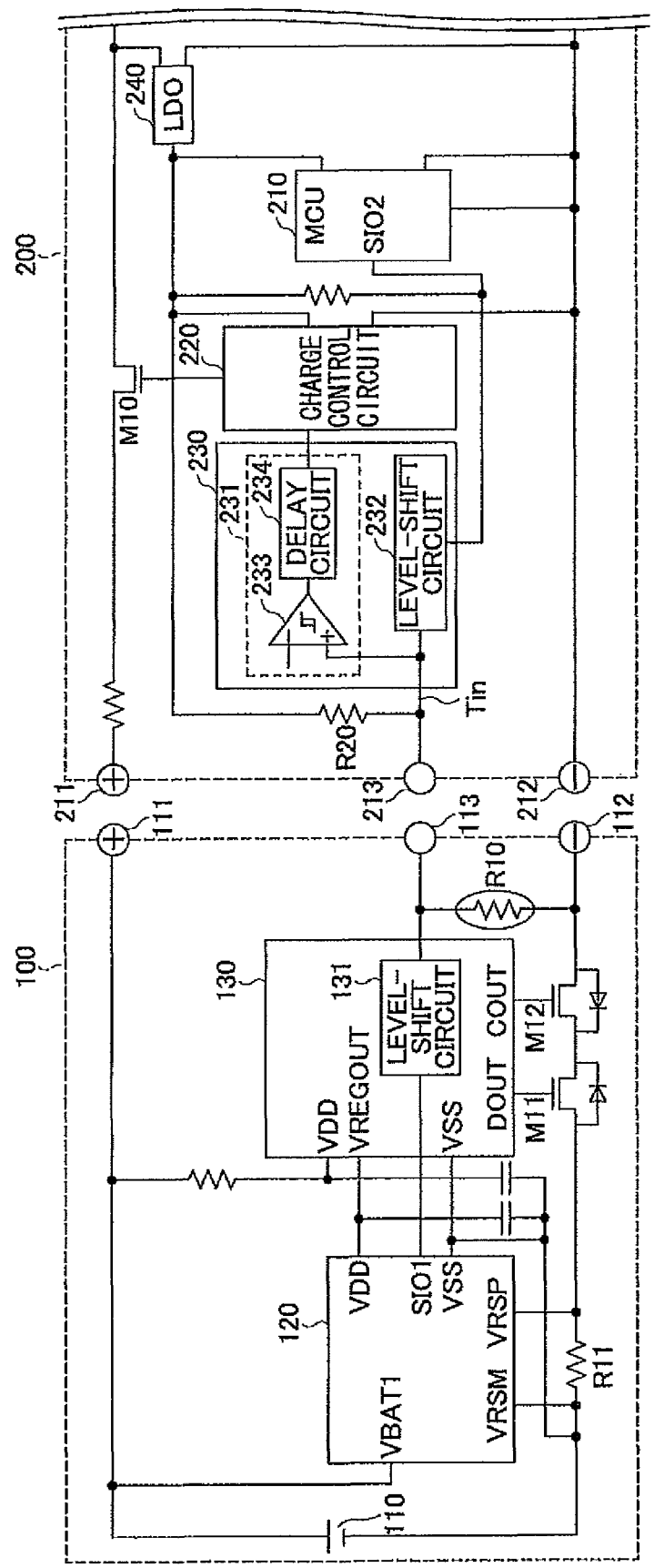
FIG. 2 is a block diagram showing an exemplary configuration of a battery pack and a portable device according to an embodiment of the present invention.

In the following, an embodiment of the present invention is described with reference to the accompanying drawings. FIG. 2 is a circuit diagram showing an exemplary configuration including a battery pack 100 and a portable device 200 according to the embodiment of the present invention.

The portable device 200 receives power from the battery pack 100, when, for example, the battery pack 100 is installed (incorporated) in the portable device 200. The portable device 200 may be an electronic device such as a cellular phone, a digital camera, or the like, driven by power from a battery pack.

First, the battery pack 100 according to the embodiment of the present invention is described with reference to FIG. 2.

As shown in FIG. 2, the battery pack 100 includes a secondary battery 110 such as a lithium-ion battery, a positive terminal 111, a negative terminal 112, an external terminal 113, a status detection IC 120, a protection IC 130, a thermistor R10, and MOS transistors M11 and M12. The positive terminal 111 and the negative terminal 112 are electronically connected to the positive terminal 211 and the negative terminal 212, respectively, of the portable device 200 when the battery pack 100 is connected to the portable device 200. Each of the status detection IC 120 and the protection IC 130 is provided between the terminals 111 and 112 and the secondary battery 110.

The protection IC 130 includes an overcharging detection circuit, an overdischarging detection circuit, and an overcurrent detection circuit.

The status detection IC 120 includes a voltage supply terminal VDD, a reference voltage terminal VSS, a voltage detection terminal VBAT1, a pair of current detection terminals VRSP and VRSM, and a communication terminal SIO1. The status detection IC 120 receives a voltage provided by regulating a battery voltage by the protection IC 130 through the power supply terminal VDD. The reference voltage terminal VSS is connected to the negative electrode of the secondary battery 110.

The status detection IC 120 detects the output voltage of the secondary battery 110 through the voltage detection terminal VBAT1 connected to the positive electrode of the secondary battery 110. The current detection terminal VRSM is connected to the negative electrode of the secondary battery 110 and is also connected to the other current detection terminal VRSP through a resistor R11 outside the status detection IC 120. The status detection IC 120 detects the current flowing through the resistor R11, namely the charging/discharging current of the secondary battery 110, through the current detection terminals VRSP and VRSM. The communication terminal SIO1 is connected through the protection IC 130 to the external terminal 113 used for communication with the portable device 200. The status detection IC 120 communicates with the portable device 200 through the communication terminal SIO1 and the protection IC 130.

The status information items of the secondary battery 110 include the remaining capacity (stored energy) of the secondary battery 110 and information items indicating an abnormal status of the secondary battery 110. The detection of the status information items by the status detection IC 120 is described in detail below.

The external terminal 113 is connected to one end of the thermistor R10, and the other end of the thermistor R10 is connected to the negative terminal 112. The thermistor R10 in this embodiment serves as a temperature detection part capable of detecting the temperature of the secondary battery 110 and is disposed in the vicinity of the secondary battery 110 in the battery pack 100 so as to be thermally coupled with the secondary battery 110. The thermistor R10 used herein may be an NTC (Negative Temperature Coefficient) thermistor having a negative temperature coefficient.

The battery pack 100 of this embodiment can cause the portable device 200 to detect a change in the voltage at the external terminal 113 due to a change in the temperature of the secondary battery 110 and to control charging of the battery pack 100.

The protection IC 130 includes terminals DOUT and COUT connected to the gates of the MOS transistors M11 and M12, respectively, capable of interrupting the charging/discharging current flowing through the battery pack 100. When overdischarging or overcurrent is detected, the protection IC 130 sets the DOUT (output) at a low level to turn OFF the MOS transistor M11. On the other hand, when overcharging is detected by the overcharging detection circuit, the protection IC 130 sets the COUT (output) at a low level to turn OFF the MOS transistor M12.

The protection IC 130 further includes a level-shift circuit 131 that shifts the level of a communication pulse signal out from the communication terminal SIO1 of the status detection IC 120. The level-shift circuit 131 shifts the level of the communication pulse signal, output from the communication terminal SIO1 and indicating the status information of the secondary battery 110, so as to enable communication between the status detection IC 120 and the portable device 200, and outputs the communication pulse signal. The output terminal of the level-shift circuit 131 is connected to the external terminal 113.

Therefore, the external terminal 113 of the battery pack 100 according to the embodiment of the present invention serves as each of the temperature detection terminal detecting the temperature of the battery pack 100 and the communication terminal for the communications between the battery pack 100 and the portable device 200.

Next, the portable device 200 according to the embodiment of the present invention is described with reference to FIG. 2.

As shown in FIG. 2, the portable device 200 includes terminals 211, 212, and 213 to be electronically connected to the positive terminal 111, the negative terminal 112, and the external terminal 113, respectively, of the battery pack 100. The terminals 211 and 212 are positive and negative power terminals, respectively. The terminal 213 connects to the external terminal 113 of the battery pack 100 to serve as a temperature detection terminal for detecting the temperature of the secondary battery 110 and as a communication terminal for communicating with the status detection IC 120.

The portable device 200 further includes a main body control circuit (hereinafter simplified as MCU) 210, a charge control circuit 220, an interface circuit 230, and a power supply circuit (hereinafter simplified as LDO) 240.

The MCU 210 controls the operations of the portable device 200 and has a communication terminal SIO2. The communication terminal SIO2 is connected to the interface circuit 230, so that the MCU 210 obtains (receives) information on the status of the battery pack 100 from the terminal 213 through the interface circuit 230.

The charge control circuit 220 controls the charging of the battery pack 100 and monitors the voltage change at the terminal 213 through the interface circuit 230. The output terminal of the charge control circuit 220 is connected to the gate of a switching device (MOS transistor) M10 in the portable device 200. The charge control circuit 220 control charging of the battery pack 100 by turning ON/OFF the switching device (MOS transistor) M10 based on the voltage change at the terminal 213.

For example, when the resistance of the thermistor R10 is reduced due to the temperature increase of the secondary battery 110 and as a result, the voltage detected at the terminal 213 becomes lower than a predetermined voltage VT, the charge control circuit 220 turns OFF the switching device (MOS transistor) M10 to stop charging of the battery pack 100.

The interface circuit 230 serves as an interface between the battery pack 100 and the charge control circuit 220 and an interface between the battery pack 100 and the MCU 210. The interface circuit 230 includes a peak-hold circuit 231 and a level-shift circuit 232. The peak-hold circuit 231 includes a comparator 233 and a delay circuit 234.

The interface circuit 230 includes an input terminal Tin connected to the terminal 213. A signal input to the input terminal Tin is further input to one of the inputs of the comparator 233 and also input to the level-shift circuit 232. A pulse signal having a predetermined pulse width is output to the other input of the comparator 233 as a reference signal, so that the pulse width of the reference signal is compared with that of the signal input to the input terminal Tin. The delay circuit 234 delays a signal by a predetermined period of time based on the output of the comparator 233. The level-shift circuit 232 shifts the level of the signal applied to the input terminal Tin to such a level so to enable communication with the MCU 210.

The LDO 240 supplies a supply voltage Vpu to each circuit in the portable device 200. Further, the LDO 240 is electronically connected to the terminal 213 through a resistor R20. Therefore, when the portable device 200 and the battery pack 100 are connected with each other, the voltage at the terminal 213 is a voltage obtained by dividing the supply voltage Vpu supplied from the LDO 240 between the resistor R20 and the thermistor R10. Namely, the voltage at the terminal 213 is obtained as the divided voltage calculated by using the values of the supply voltage Vpu, the resistor R20, and the thermistor R10.

Next, before describing the operations of the portable device 200 and the battery pack 100, a case is described where the external terminal 113 is used as both the temperature detection terminal detecting the temperature of the battery pack 100 and the communication terminal for communications between the battery pack 100 and the portable device 200 at the same time.

In this embodiment, when the portable device 200 and the battery pack 100 are connected with each other, in the portable device 200, the voltage at the external terminal 113 of the battery pack 100 is pulled up to the supply voltage Vpu through the resistor 20 inside the portable device 200. The values of the resistance of the R20 (Rpu) and the voltage of the supply voltage Vpu are determined based on the specifications of the portable device 200.

The resistance of the thermistor R10 varies depending on the temperature of the battery pack 100. Therefore, a voltage Vth at the external terminal 113 (terminal 213) is determined by a ratio of voltage division between the resistance (Rpu) of the R20 and a resistance (Rth) of the thermistor R10.

On the other hand, in this embodiment, the portable device 200 determines whether to continue charging the battery pack 100 by monitoring the voltage Vth at the external terminal 113 and determining whether the temperature of the battery pack 100 allows charging. Therefore, desirably, the voltage Vth at the external terminal 113 be stable with respect to the temperature of the battery pack 100.

Namely, when the communications between the portable device 200 and the battery pack 100 are executed through the external terminal 113, the communication pulse signal is applied to the voltage Vth. Therefore, the temperature detection in the portable device 200 may malfunction.

Further, the status detection IC 120 outputting the communication pulse signal operates with a supply voltage from the secondary battery 110, and uses the voltage Vth as hi-level (hereinafter simplified as H-level) and the zero (0) volts as low-level (hereinafter simplified as L-level). The MCU 210 operates with the voltage (supply voltage Vpu) which is greater than the voltage used to operate the status detection IC 120. Therefore, there is a difference in voltage between the signal used in the status detection IC 120 and that in the MCU 210.

Therefore, the MCU 210 can handle the output 0 V signal of the status detection IC 120 as a L-level signal, while the MCU 210 handles the voltage Vth as a H-level signal. For example, if a change in the temperature of the secondary battery 110 lowers the voltage Vth, the difference between the 0 V signal, which is a L-level signal, and the voltage Vth, which is a H-level signal, is reduced. This may make it difficult to distinguish between the H-level signal and noise, thus causing malfunction, or may cause generation of leakage current if the specifications of the portable device 200 are such that the voltage Vth is around ½ (half) of the supply voltage Vpu at normal operating temperature of the battery pack 100.

In the battery pack 100 and the portable device 200 according to the embodiment of the present invention, by having the interface circuit 230 in the portable device 200, the above concern may be eliminated without changing the specifications of the portable device 200.

In the following, the operations of the battery pack 100 and the portable device 200 according to the embodiment of the present invention are described.

When the battery pack 100 and the portable device 200 are connected to each other, the portable device 200 may communicate with the battery pack 100 while detecting the temperature of the battery pack 100.

If the temperature of the battery pack 100 is such that the battery pack 100 can be charged, the voltage Vth at the external terminal 113 connected to the thermistor R10 is higher than the predetermined voltage VT serving as a reference in determining that the battery pack 100 cannot be charged. In this case, when the voltage of the communication pulse signal out of the status detection IC 120 is applied to the external terminal 113, the voltage Vth at the external terminal 113 may be temporarily lower than the predetermined voltage VT while the voltage of the communication pulse signal is at the L-level.

According to the portable device 200 of this embodiment, when the time period during which the voltage Vth is lower than the predetermined voltage VT is equal to or shorter than a predetermined time period, the interface circuit 230 determines that the signal from the external terminal 113 does not indicate an abnormal temperature, namely the interface circuit 230 determines that the signal out of the external terminal 113 still indicates a normal temperature, and as a result, does not prevent the battery pack 100 from being charged. This determination is made by using the difference between the time period required to determine that the temperature of the battery pack 100 is abnormal (hereinafter referred to as temperature detection time) and the time period of one clock pulse of the communication pulse signal. Typically, the temperature detection time is longer than the time period of one clock pulse of the communication pulse signal. Therefore, the portable device 200 according to the embodiment of the present invention determines whether the signal input from the external terminal 113 is a communication pulse signal or a signal indicating that the temperature of the battery pack 100 is abnormal by using the reference signal having a pulse width equal to the temperature detection time.

The signal input from the external terminal 113 becomes an input signal to the peak-hold circuit 231 of the interface circuit 230. In the peak-hold circuit 231, the input signal (communication pulse signal) is input to one of the input terminals of the comparator 233. The comparator 233 compares the pulse width of the input signal with the pulse width of the reference signal input to the other input terminal of the comparator 233. When the pulse width of the input signal is shorter than that of the reference signal, the comparator 233 inverts its output signal.

The delay circuit 234 in the interface circuit 230 holds the peak value of the voltage Vth (H-level of the input signal) of the changing output signal from the comparator 233, and outputs the held peak value to the charge control circuit 220. The charge control circuit 220 determines that the voltage Vth is at the H-level. Namely, the charge control circuit 220 determines that the reduction of the resistance value of the thermistor R10 due to the temperature increase of the secondary battery 110 is not occurred, further determines that the battery pack 100 can be charged, and continues the charging.

In this embodiment, for example, when the voltage Vth at the external terminal 113 is lower than the predetermined voltage VT for one second or more, the temperature of the battery pack 100 is determined to be abnormal. Therefore, in this case, the pulse width of the reference signal is one second. Further, when the time period of one clock pulse of the input signal to the peak-hold circuit 231 is less than one second, the temperature is not determined to be abnormal. The pulse width of the reference signal may be determined when the interface circuit 230 is designed.

On the other hand, when the temperature of the battery pack 100 is such that the battery pack 100 cannot be charged, the time period during which the voltage Vth at the external terminal 113 connected to thermistor R10 is lower than the predetermined voltage VT is longer than the temperature detection time. Namely, in the comparator 233, the pulse width of the input signal from the external terminal 113 is longer than the pulse width of the reference signal. Therefore, the output signal of the comparator 233 is not inverted, and the delay circuit 234 directly outputs the input signal to the charge control circuit 220.

Then, the charge control circuit 220 receives the signal from the interface circuit 230 and detects that the voltage Vth is at the L-level. Therefore, the charge control circuit 220 determines that the resistance of the thermistor R10 is reduced due to the temperature increase of the secondary battery 110, determines that there is an abnormal temperature of the battery pack 100, and as a result, turns OFF the switching device M10 to stop the charging the secondary battery 110.

As described above, the portable device 200 according to the embodiment of the present invention includes the interface circuit 230. With the interface circuit 230, it becomes possible to accurately detect the temperature of the battery pack 100 by detecting the voltage at the external terminal 113 even while the external terminal 113 is being used as the communication terminal for the communications between the battery pack 100 and the portable device 200.

Further, the interface circuit 230 in the portable device 200 according to the embodiment of the present invention converts the communication pulse signal having a range between zero (0) volts and Vth volts into a signal having a range between zero (0) volts and Vpu volts which is the power supply voltage supplied to the MCU 210, and outputs the thus-converted signal to the MCU 210. By converting the level of the signal with the interface circuit 230, it becomes possible for the MCU 210 to receive the communication pulse signal with normal processing without changing the specifications of the MCU 210 in the portable device 200.

By having this configuration, the portable device 200 may communicate with the battery pack 100 through the external terminal 113 even while the external terminal 113 is being used as the temperature detection terminal.

Therefore, the portable device 200 and the battery pack 100 may communicate with each other and the portable device 200 may detect the temperature of the battery pack 100 without increasing the number of terminals.

Further, according to the embodiment of the present invention, by having the interface circuit 230 in the portable device 200, the portable device 200 and the battery pack 100 may communicate with each other without changing the specifications of the MCU and the charge control circuit that have been used in conventional portable devices. Therefore, according to the embodiment of the present invention, such a status management function with respect to the battery pack 100 based on the status information of the secondary battery 110 obtained from the battery pack 100 may be added without changing the specifications of the conventional portable device.

Next, a method of obtaining the data of the status information items indicating the status of secondary battery 110 in the battery pack 100 is described with reference to FIGS. 3 and 4.

Figure 3:
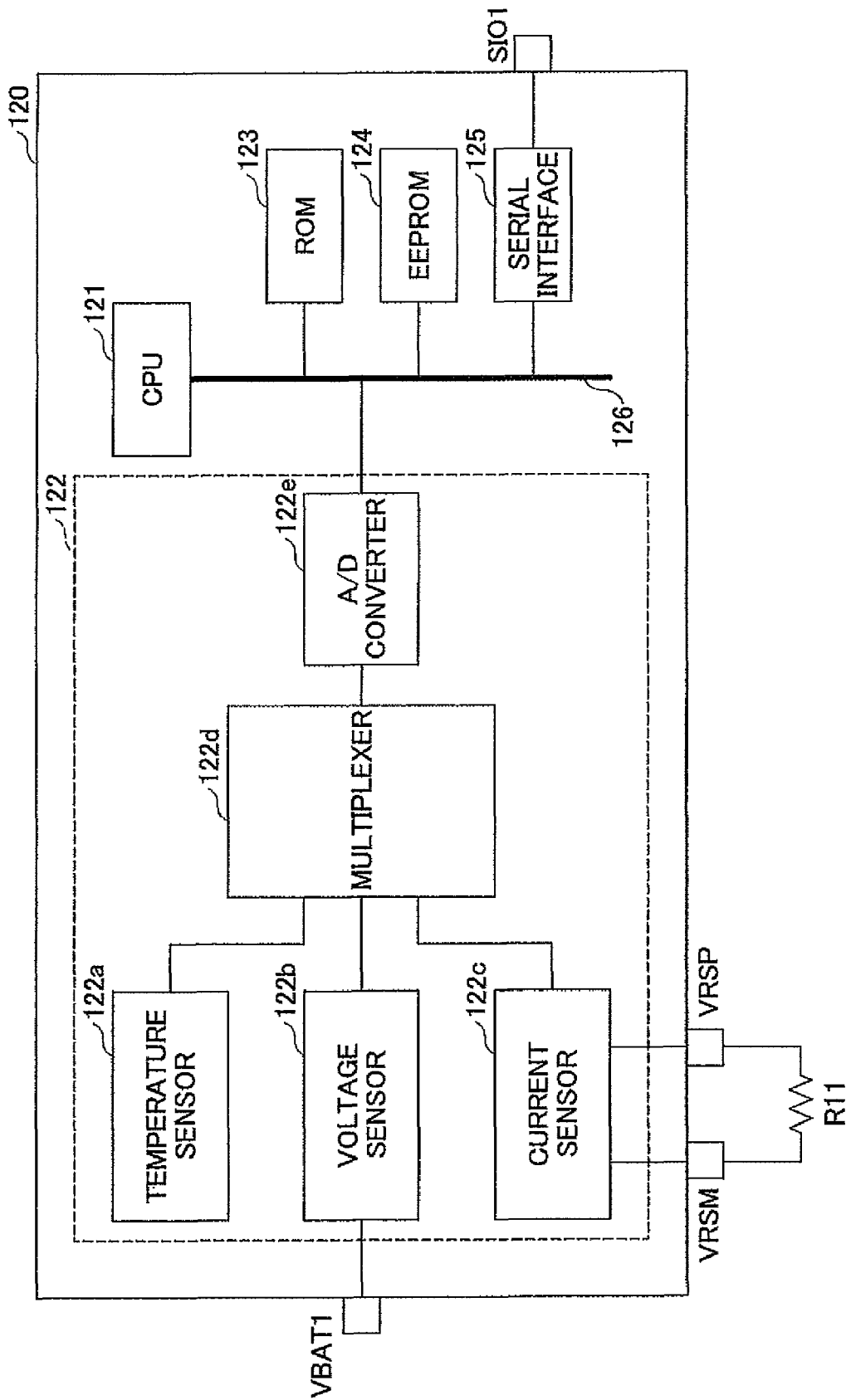
FIG. 3 is a block diagram showing an exemplary hardware configuration of a status detection IC in the battery pack.

FIG. 3 is a block diagram showing a hardware configuration of the status detection IC 120. As shown in FIG. 3, the status detection IC 120 includes a CPU (Central Processing Unit) 121, a sensing section 122, a ROM (Read Only Memory) 123, an EEPROM (Electrically Erasable Programmable ROM) 124, and a serial interface (I/F) 125.

The CPU 121 controls each part of the status detection IC 120. The sensing section 122 detects the voltage, the current, and the temperature of the secondary battery 110 (see FIG. 2). The ROM 123 stores a program to cause the CPU 121 to control each part of the status detection IC 120. The EEPROM 124 may store the information items including each parameter of the voltage, the current, and the temperature of the secondary battery 110 and an authentication ID for authentication with the portable device 200, and the like. The serial interface 125 is for communications with the portable device 200 through the communication terminal SIO1. The CPU (Central Processing Unit) 121, the sensing section 122, the ROM 123, the EEPROM 124, and the serial interface (I/F) 125 are connected to each other through a bus 126, and data and programs can be transmitted and received through the bus 126.

The sensing section 122 includes a temperature sensing circuit 122a, a voltage sensing circuit 122b, a current sensing circuit 122c, a multiplexer 122d, and an analog-to-digital converter 122e.

The temperature sensing circuit 122a detects the temperature of the secondary battery 110. The voltage sensing circuit 122b detects the output voltage of the secondary battery 110 through the voltage detection terminal VBAT1 connected to the positive electrode of the secondary battery 110. The current sensing circuit 122c detects the charging/discharging current flowing through the resistor R11, namely the charging/discharging current of the secondary battery 110, through the current detection terminals VRSP and VRSM. Each output from the temperature sensing circuit 122a, the voltage sensing circuit 122b, and the current sensing circuit 122c is fed to the multiplexer 122d. The multiplexer 122d multiplexes those signals together and outputs the multiplexed signal to the analog-to-digital converter 122e. The analog-to-digital converter 122e converts the analog multiplexed signal from the multiplexer 122d into a digital signal.

Figure 4:
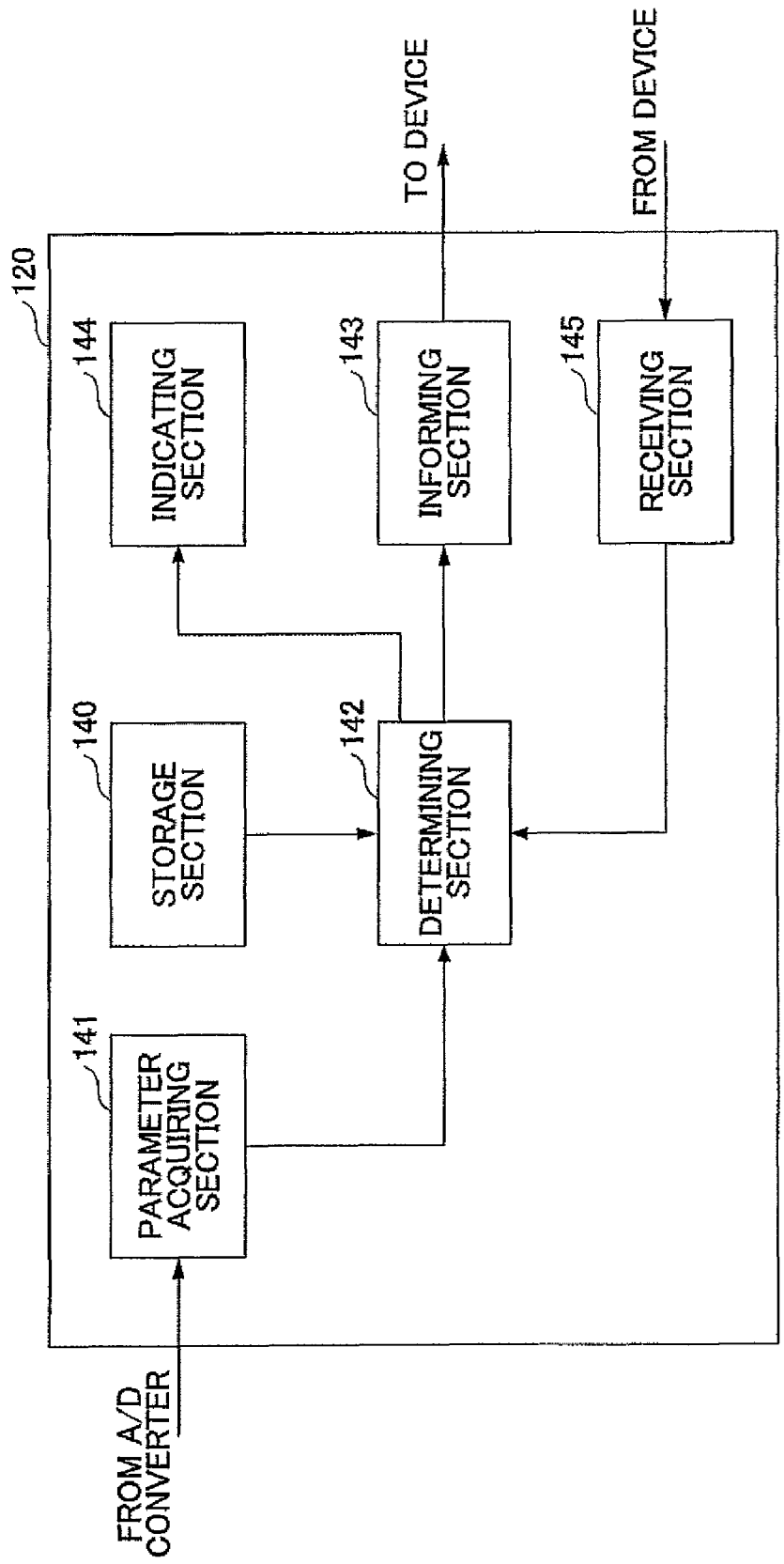
FIG. 4 is a block diagram showing an exemplary functional configuration of the status detection IC in the battery pack.

FIG. 4 is a block diagram showing a functional configuration of the status detection IC 120. The functional configuration in FIG. 4 may be realized by executing a specific program stored in the ROM 123 in FIG. 3. Another hardware module (element) may be added to the hardware configuration in FIG. 3 when another function is to be realized in another embodiment of the present invention.

As shown in FIG. 4, the status detection IC 120 includes a storage section 140, a parameter acquiring section 141, a determining section 142, an informing section 143, an indicating section 144, and a receiving section 145.

The storage section 140 stores the data of status information items indicating the status of the secondary battery 110 (see FIG. 2). The status information items may include the full charge capacity, the remaining capacity, and/or the voltage of the secondary battery 110. The storage section 140 may also be used as a part of the storage area of the EEPROM 124 shown in FIG. 3.

The parameter acquiring section 141 acquires the data of the voltage, the current, and/or temperature detected by the sensing section 122 as the corresponding parameters indicating the status of the secondary battery 110.

The determining section 142 determines whether the secondary battery 110 is in an abnormal status based on the data of the status information items stored in the storage section 140 and the acquired parameters by the parameter acquiring section 141. Further, the determining section 142 determines whether the secondary battery 110 is degraded based on the data of the status information items stored in the storage section 140 and the acquired parameters by the parameter acquiring section 141. The term abnormal status refers to, for example, a case where the temperature of the secondary battery 110 shows that the secondary battery 110 cannot be charged, the secondary battery 110 is not an authenticated product with respect to the portable device 200, and the like.

The informing section 143 reports that the secondary battery 110 is in an abnormal status to the portable device 200 when the determining section 142 determines that the secondary battery 110 is in an abnormal status. More specifically, the informing section 143 causes the serial interface 125 in FIG. 3 to report that the secondary battery 110 is in an abnormal status to the portable device 200.

Further, the indicating section 144 indicates that the secondary battery 110 is in an abnormal status when the determining section 142 determines that the secondary battery 110 is in an abnormal status. For example, the indicating section 144 may indicate that the secondary battery 110 is in an abnormal status to a user by turning ON an LED on the battery pack 100.

The receiving section 145 receives an authentication signal (including, for example, the authentication ID) and the like from the portable device 200. More specifically, the receiving section 145 causes the serial interface 125 to receive the authentication signal from the portable device 200.

In the status detection IC 120 according to the embodiment of the present invention, by having the above function in the sections, it becomes possible to acquire the data of the status information items of the secondary battery 110 and feed the acquired data to the portable device 200. Further, in the status detection IC 120 according to the embodiment of the present invention, it becomes possible to acquire the authentication ID registered in the portable device 200 in advance, determine whether the secondary battery 110 is an authenticated product, and report the determined result to the portable device 200.

Though an embodiment is described in detail above, the present invention is not limited to the specific embodiment described above, and variations and modification may be made without departing from the spirit and scope of the present invention.

The present invention is based on Japanese Priority Application No. 2007-326444, filed on Dec. 18, 2007, the entire contents of which are hereby incorporated herein by reference.

What is claimed is:

1. A portable device, comprising:
a charge control circuit configured to control charging of a secondary battery included in a battery pack, the secondary battery being configured to supply power to the portable device;
a temperature detection terminal at which a temperature of the secondary battery from a temperature detection part of the battery pack is detected;
positive and negative power terminals to be connected to the battery pack;
a control circuit configured to control an operation of the portable device; and
an interface circuit including a peak-hold circuit and a level-shift circuit connected in parallel to the temperature detection terminal, the peak-hold circuit having an output terminal thereof connected to an input terminal of the charge control circuit and the level-shift circuit having an output terminal thereof connected to an input terminal of the control circuit,
wherein a signal detected at the temperature detection terminal is directly input to each of the peak-hold circuit and the level-shift circuit of the interface circuit to be fed to each of the charge control circuit and the control circuit through the interface circuit.

2. A portable device, comprising:
a charge control circuit configured to control charging of a secondary battery included in a battery pack, the secondary battery being configured to supply power to the portable device;
a temperature detection terminal at which a temperature of the secondary battery from a temperature detection part of the battery pack is detected;
positive and negative power terminals to be connected to the battery pack;
a control circuit configured to control an operation of the portable device; and an interface circuit connected between the temperature detection terminal and each of an input terminal of the charge control circuit and an input terminal of the control circuit,
wherein a signal detected at the temperature detection terminal is input to the interface circuit to be fed to each of the charge control circuit and the control circuit through the interface circuit,
the interface circuit includes a peak-hold circuit to which the signal detected at the temperature detection terminal is input,
an output terminal of the peak-hold circuit is connected to the input terminal of the charge control circuit, and
the peak-hold circuit is configured to compare a pulse width of the signal detected at the temperature detection terminal and a pulse width of a reference signal and to hold a peak value of the signal detected at the temperature detection terminal in response to the pulse width of the signal detected at the temperature detection terminal being less than the pulse width of the reference signal.

3. The portable device according to claim 1, wherein:
the level-shift circuit is configured to change a level of the signal detected at the temperature detection terminal.

4. The portable device according to claim 1, further comprising:
a battery pack including:
a first external terminal connected to the temperature detection terminal;
second and third external terminals connected to the positive and negative power terminals, respectively, of the portable device;
a secondary battery connected between the second external terminal and the third external terminal;
a status detection circuit connected between the second external terminal and the third external terminal and configured to detect a status of the secondary battery;
a thermistor connected between the first external terminal and the third external terminal; and
a level-shift circuit connected between the first external terminal and an output terminal of the status detection circuit and configured to change a voltage level of an output signal of the status detection circuit.

5. A battery pack, comprising:
a first external terminal to be connected to a temperature detection terminal of a portable device;
second and third external terminals to be connected to positive and negative power terminals, respectively, of the portable device;
a secondary battery connected between the second external terminal and the third external terminal;
a status detection circuit connected between the second external terminal and the third external terminal and configured to detect a status of the secondary battery and output a pulse signal communicating information on the status of the secondary battery;
a thermistor connected between the first external terminal and the third external terminal, the thermistor being disposed in a vicinity of the secondary battery to be thermally coupled with the secondary battery; and
a level-shift circuit connected between the first external terminal and an output terminal of the status detection circuit and configured to change a voltage level of the output pulse signal of the status detection circuit,
wherein the output pulse signal of the status detection circuit is input to the first external terminal through the level-shift circuit, and a voltage at the first external terminal indicates information on a temperature of the secondary battery and the information communicated by the output pulse signal of the status detection circuit.

6. The portable device according to claim 1, wherein:
the peak-hold circuit holds a peak value of the signal detected at the temperature detection terminal in response to a pulse width of the signal detected at the temperature detection terminal being less than a predetermined width.

7. A battery pack for the portable device as set forth in claim 1, the battery pack comprising:
a first external terminal to be connected to the temperature detection terminal of the portable device;
second and third external terminals to be connected to the positive and negative power terminals, respectively, of the portable device;
the secondary battery connected between the second external terminal and the third external terminal;
a status detection circuit connected between the second external terminal and the third external terminal and configured to detect a status of the secondary battery and output a pulse signal communicating information on the status of the secondary battery;
a thermistor connected between the first external terminal and the third external terminal; and
a level-shift circuit connected between the first external terminal and an output terminal of the status detection circuit and configured to change a voltage level of the output pulse signal of the status detection circuit,
wherein the output pulse signal of the status detection circuit is input to the first external terminal through the level-shift circuit, and
a voltage at the first external terminal indicates information on the temperature of the secondary battery and the information communicated by the output pulse signal of the status detection circuit.

8. A battery pack for the portable device as set forth in claim 2, the battery pack comprising:
a first external terminal to be connected to the temperature detection terminal of the portable device;
second and third external terminals to be connected to the positive and negative power terminals, respectively, of the portable device;
the secondary battery connected between the second external terminal and the third external terminal;
a status detection circuit connected between the second external terminal and the third external terminal and configured to detect a status of the secondary battery and output a pulse signal communicating information on the status of the secondary battery;
a thermistor connected between the first external terminal and the third external terminal; and
a level-shift circuit connected between the first external terminal and an output terminal of the status detection circuit and configured to change a voltage level of the output pulse signal of the status detection circuit,
wherein the output pulse signal of the status detection circuit is input to the first external terminal through the level-shift circuit, and
a voltage at the first external terminal indicates information on the temperature of the secondary battery and the information communicated by the output pulse signal of the status detection circuit.

9. The battery pack as claimed in claim 5, wherein the thermistor has a first end connected to the third external terminal and has a second end connected between an output of the level-shift circuit and the first external terminal.

* * * * *